W. D. SMITHEY.
MEANS FOR GENERATING AND STORING POWER.
APPLICATION FILED JUNE 8, 1917.
1,254,737.
Patented Jan. 29, 1918.
3 SHEETS—SHEET 1.
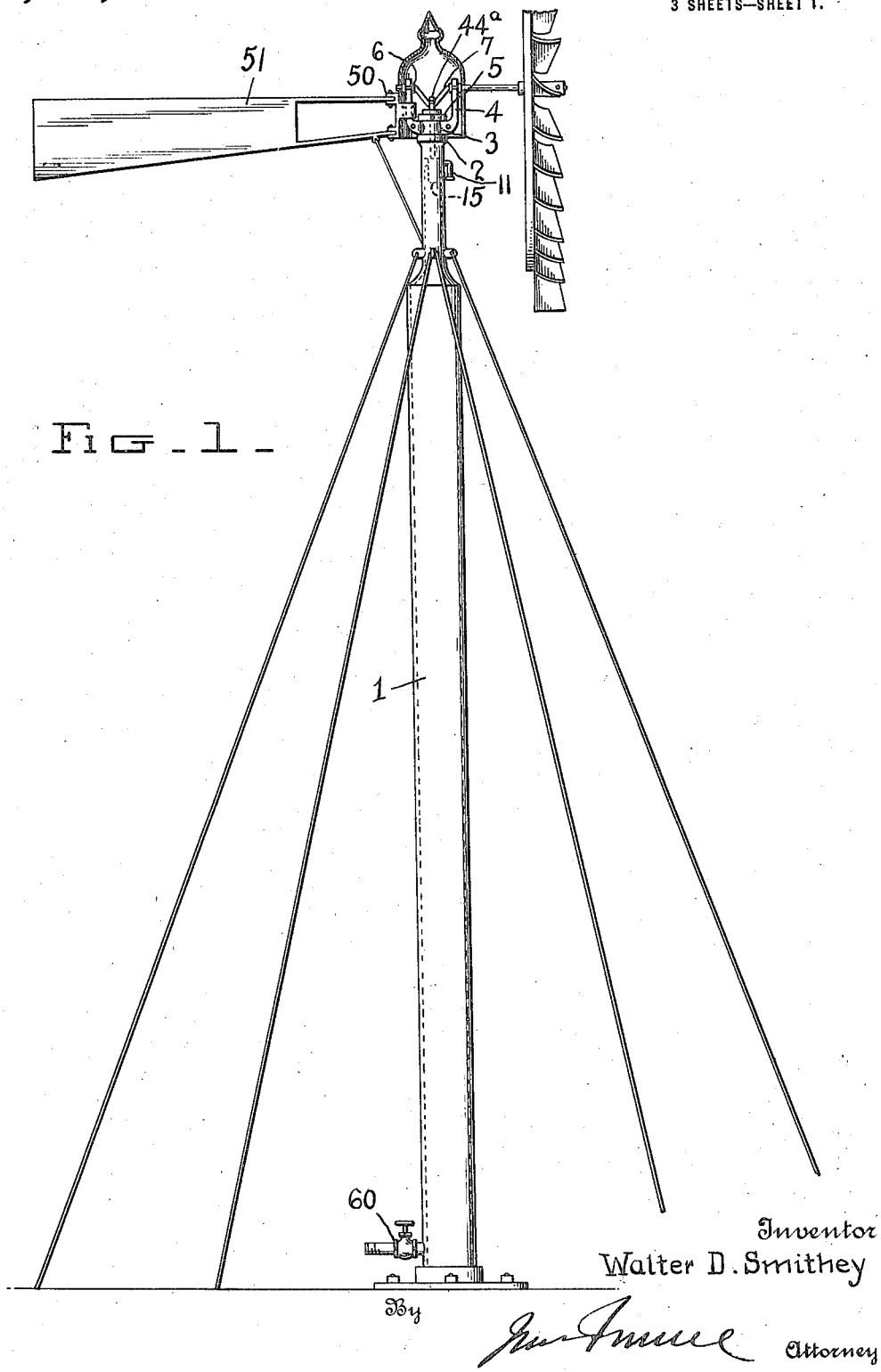

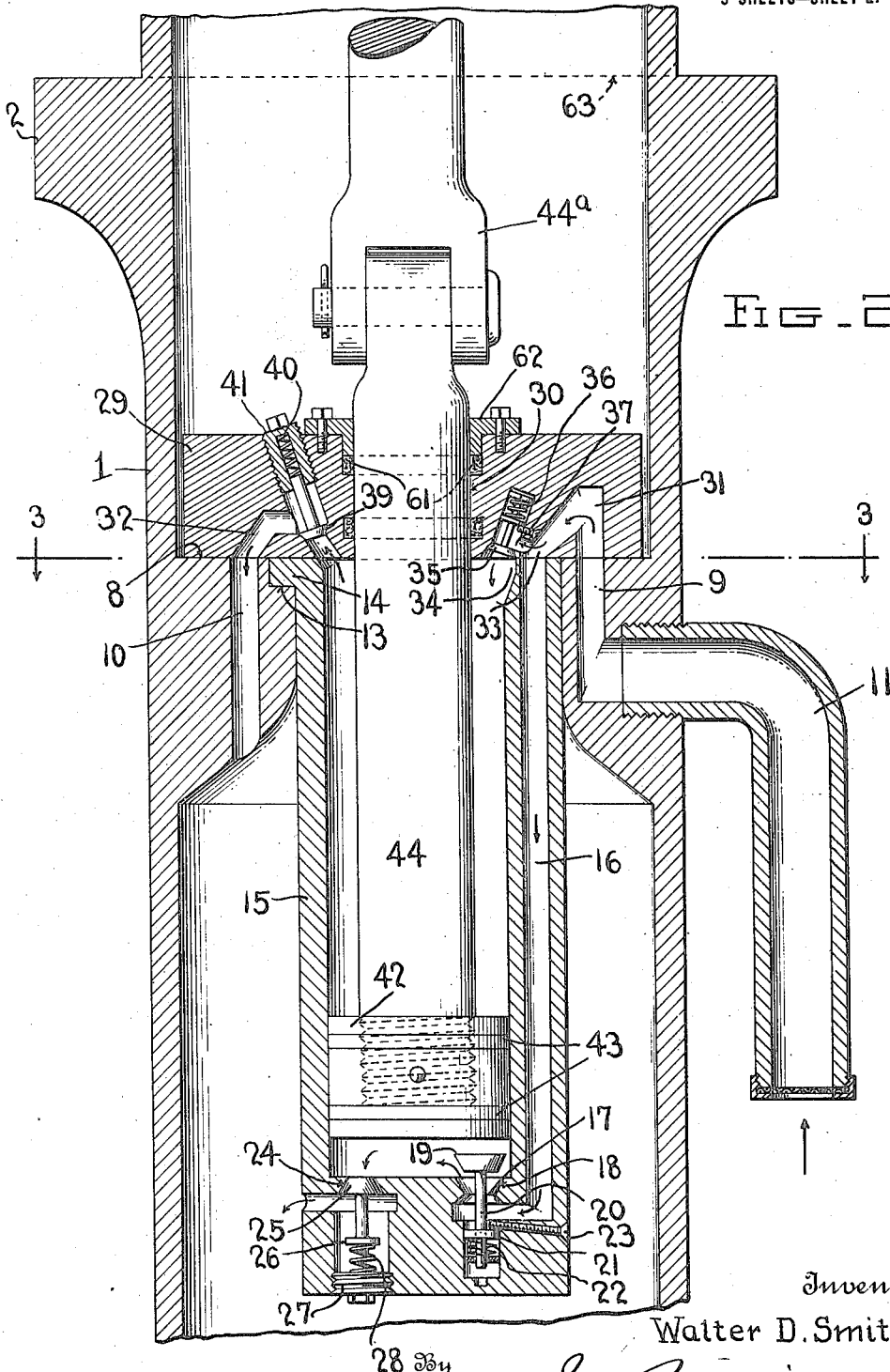

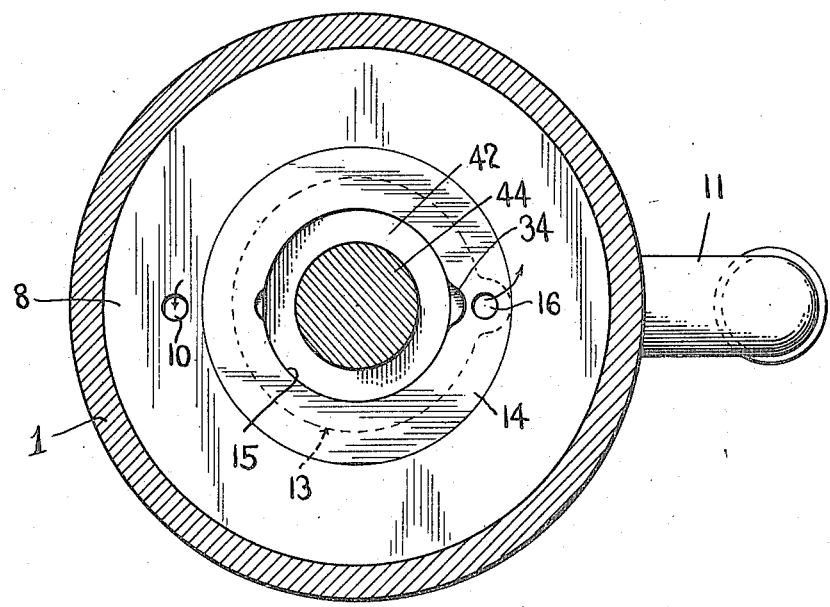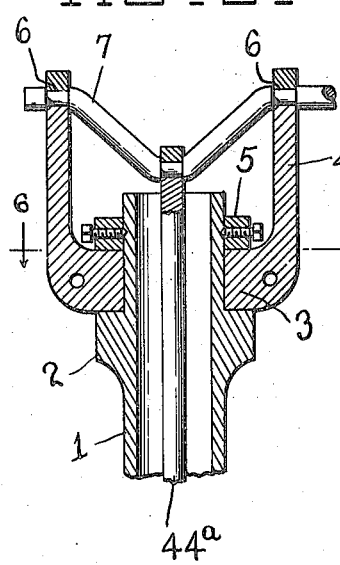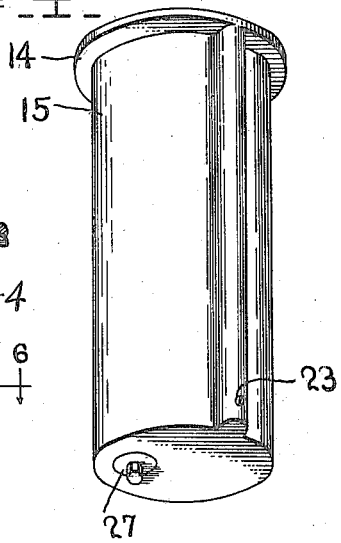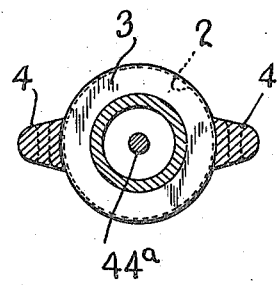

UNITED STATES PATENT OFFICE.

WALTER DUKE SMITHEY, OF BAY CITY, TEXAS.

MEANS FOR GENERATING AND STORING POWER.

1,254,737.　　　　　　　　Specification of Letters Patent.　　　Patented Jan. 29, 1918.

Application filed June 8, 1917. Serial No. 173,625.

*To all whom it may concern:*

Be it known that I, WALTER DUKE SMITHEY, a citizen of the United States of America, residing at Bay City, in the county of Matagorda and State of Texas, have invented certain new and useful Improvements in Means for Generating and Storing Power, of which the following is a specification.

My invention relates to improvements in means for generating and storing power.

The object of my invention is to provide a wind mill structure, associated with a combined reservoir and support for the wind mill, whereby air is compressed and stored to be subsequently utilized for power purposes.

A further object of the invention is to provide a reservoir, so constructed and arranged as to act as a tower for a wind mill, thereby producing an economical and convenient means for producing a power plant.

The invention also comprehends improvements in the details of construction and arrangement of parts which will be hereinafter described and particularly pointed out in the claims.

In the accompanying drawings,

Figure 1 is a side elevation illustrating the application of the invention,

Fig. 2 is an enlarged detail section of the pump mechanism,

Fig. 3 is a detail cross section of the pump,

Fig. 4 is a detail perspective view of the pump cylinder,

Fig. 5 is a detail vertical section of the upper end of the tower,

Fig. 6 is a detail horizontal section of the upper end of the tower.

1 indicates a cylindrical tower of appropriate height, the lower portion of said tower serving as a reservoir for compressed air, while the upper portion serves as a support for a wind mill, and a receptacle to receive oil to lubricate the moving parts. On the upper end of the outside of the tower is an annular flange 2, and supported thereon is the annular portion 3, of a yoke 4. The yoke is held in position by a collar 5, secured to the tower by bolts, the collar and annular portion 3, forming an annular track in which the yoke rotates.

Mounted in transverse bearings 6, formed on the upper ends of the yoke, is a crank shaft 7, and supported on the outer end thereof is a wheel of usual construction.

On the interior of the tower below the top thereof, is an annular flange 8, formed with air inlet and outlet ports 9 and 10, and communicating with the inlet port 9, is a pipe 11, which communicates with the atmosphere. The inner edge of the annular flange 8, is formed with a seat 13, and fitting therein is the flange 14, of a cylinder 15, which depends in the tower. The cylinder is formed in one side with a vertical inlet port 16, and at its lower end it communicates with an inlet port 17, formed in the bottom of the cylinder, the inlet port 17 having a valve seat 18, as shown. A valve 19 is adapted to close the port 17, and it is provided with a stem 20, which extends into a pocket in the bottom of the cylinder. On the stem is a collar 21, and between same and a flange fixed in the pocket is a spring 22, which normally tends to keep the valve in open position, the movement of the valve being limited by a screw 23, which is inserted in the side of the cylinder.

Also in the bottom of the cylinder is an outlet port 24, normally closed by a valve 25, the stem of which extends into a pocket 26, closed by a cap 27, and between the latter and the valve is a spring 28.

On the top of the inner annular flange 8, and the cylinder 15, is a cap 29, bolted or otherwise secured in position, and formed with a central opening 30. In the bottom of the cap are formed inlet and outlet ports 31 and 32. The inlet port 31, communicates with the vertical port 16, in the cylinder and the outlet port 32, communicates with the outlet port 10 in the annular flange, and it is also provided with a branch port 33, which communicates with an air inlet port 34, communicating with the top of the cylinder. Normally closing the air inlet port 34, is a valve 35, actuated to closed position by a spring 36, and held in operative position and limited in its movement in one direction by a screw 37. In the outlet port 32, is a valve 39, normally held in closed position by a spring 40, housed in a screw 41, extended through the cap 29.

42, indicates a piston mounted in the cylinder, and provided with packing ring 43, and secured to the lower end of a piston rod 44. The upper end of the piston rod is pivotally connected to a pitman 44ª, the latter engaging the crank of the crank shaft located directly over the tower.

On a lug 50, extending from the yoke 4, is pivoted a vane 51, coupled to the wind wheel in the usual manner to insure of the wheel being properly positioned to receive the wind, the vane of course being also connected up so as to position the wheel away from the wind, when it is not desired to use the pump.

Over the yoke fits a cap to protect the mechanism from the elements.

In operation, the wind rotates the wheel and its shaft and the piston is reciprocated in the cylinder. When the piston rises in the cylinder, air is drawn through the ports 9, 31, 16 and 18, the valve 19, being lifted from its seat by suction, consequently a supply of air is drawn into the cylinder below the piston. This action of the piston serves to close the lower outlet port 24. As the piston rises, the compression above, closes the upper inlet port 35, while the upper outlet port 14, is opened and compressed air above the piston is forced through the outlet ports 32 and 10 and into the reservoir below the cylinder. When the movement of the piston is reversed, or in other words when it descends the suction created above, opens the upper inlet valve 35, and closes the upper outlet valve 39, the air then entering through the inlet ports, 9, 31, 33, and 34. As the piston descends the compression acts to close the lower inlet valve 19, against the action of its spring, while the lower outlet valve 25, is opened under the influence of the compression, and compressed air is forced into the reservoir.

Obviously, as the piston continues to reciprocate the air passing through the inlet valves is compressed, and forced into the reservoir, and can be conveyed therefrom to be utilized for power purposes, through the pipe 60, at the bottom of the reservoir.

The construction and arrangement of the parts at the top of the tower, permit of the wind mill swinging to any degree without in any wise effecting the operation of the pump, as it is evident that the piston rod can readily turn with the wind mill, even though the piston is being reciprocated, the central opening in the cap having a packing ring 61, and a gland 62, to form a tight joint.

In a high speed pump, such as described, it is essential that the parts be properly lubricated. Hence oil, to a level indicated at 63, is deposited in the tower, above the cylinder, consequently the piston rod and its connections will receive the necessary lubrication.

The lower inlet valve 19, performs a dual function, to wit, permits the passage of air, and serves as a governor, the tension of the spring 22 is such that when the wind wheel is rotating slowly, the compression of the piston on its downward stroke is not sufficient to close the valve, the air below the piston at this time being simply worked back and forth in the inlet passage, thus relieving pressure on the lower outlet valve 25, and therefore the latter is retained in its closed position. When the speed of the wind wheel increases and the rapid movement of the piston creates compression sufficient to overcome the tension of the spring 22, the valve 19 is closed, and the valve 25 is opened and the air is forced into the reservoir. By this means the speed of the wind wheel is governed, for obviously the speed of the piston is determined by the exit of the air acted upon.

The upper inlet valve 35, is so arranged that upon each upward stroke of the piston the water is forced from the cylinder but in the case of the lower inlet valve this may be closed at intervals, depending entirely upon the speed of the wind wheel. It follows that under the circumstances the piston may pump air to the reservoir on the downward stroke once in every revolution of the wheel, or once every tenth or other stroke, or the piston may reach the desired speed on a half stroke, or at any other point and then pump the air through the lower outlet valve. By this means the lower inlet valve acts to regulate the speed in the same sense as a governor.

What I claim is:—

1. In combination, a hollow tower provided at its upper end with an annular track, a wind mill rotatably mounted on the track and including a crank shaft, a flange on the interior of the tower, an air pump cylinder having a flange mounted on the interior flange within the hollow tower, inlet and outlet valves in the cylinder, a cap mounted on the flange and over the top of the flanged cylinder, inlet and outlet valves in the cap, air inlet and outlet ports formed in the tower, cylinder, and cap, the outlet ports communicating with the tower below the top of the cylinder, and the inlet ports communicating with the atmosphere, a piston in the pump cylinder, and a pitman connecting the piston and the crank shaft.

2. In combination, a hollow tower provided at its upper end with an annular flange, a yoke rotatably supported on the flange, means for holding the yoke in position on the flange, a wind mill mounted on the yoke, including a crank shaft, a flange on the interior of the tower, an air pump supported on the interior flange, said air pump including a piston and valved air inlet and outlet ports, the outlet ports communicating with the tower below the top of the pump, and the inlet ports communicating with the atmosphere, and a pitman connecting the piston and the crank shaft.

3. In combination, a hollow tower, a wind mill rotatably mounted to swing around the top of the tower including a crank shaft, a flange on the interior of the hollow tower below the top of the latter, a pump cylinder suspended on the flange, a cap fitted over the annular flange and the pump cylinder, a piston in the cylinder, a connection between the piston and the crank shaft, the flange cylinder and cap having air inlet and outlet ports, and the bottom of the cylinder having other air inlet and outlet ports, the inlet ports communicating with the atatmosphere and the outlet ports communicate with the hollow tower below the annular flange.

4. In combination, a wind mill including a crank shaft, a tubular tower having a rigid internal support, an air pump wholly supported by the rigid support and depending centrally therefrom and into the tubular tower and including a centrally disposed piston rod extending above the rigid support, in vertical alinement with the crank shaft, a pitman connecting the piston and the crank shaft, and a rotary mounting at the top of the tubular tower to support the wind mill.

5. In combination, a hollow tower provided at its upper end with an annular track, a yoke rotatably supported on the track, a wind mill mounted on the yoke including a crank shaft, a flange on the interior of the tower, an air pump supported on the interior flange, said air pump including upper and lower inlet and outlet valves and a piston, the upper and lower inlet valves communicating with the tower, one of said inlet valves having a spring to normally hold same open until the speed of the piston reaches a point to create velocity sufficient to close the valve against the tension of the spring, and a connection between the piston and the wind mill.

In testimony whereof I affix my signature in the presence of two witnesses.

WALTER DUKE SMITHEY.

Witnesses:
PAUL S. LEWIS,
EDWARD R. MOFFETT.

Copies of this patent may be obtained for five cents each, by addressing the "Commissioner of Patents, Washington, D. C."